(12) United States Patent
Chen et al.

(10) Patent No.: US 9,001,506 B2
(45) Date of Patent: Apr. 7, 2015

(54) BATTERY EJECTION SYSTEM FOR A PORTABLE COMPUTER

(75) Inventors: Kimbo Chen, Taipei (TW); Kevin Massaro, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 54 days.

(21) Appl. No.: 13/517,167

(22) PCT Filed: Apr. 30, 2010

(86) PCT No.: PCT/US2010/033223
§ 371 (c)(1),
(2), (4) Date: Jun. 19, 2012

(87) PCT Pub. No.: WO2011/136802
PCT Pub. Date: Nov. 3, 2011

(65) Prior Publication Data
US 2012/0257350 A1    Oct. 11, 2012

(51) Int. Cl.
| H05K 5/00 | (2006.01) |
| H05K 7/00 | (2006.01) |
| G06F 1/16 | (2006.01) |
| G06F 1/18 | (2006.01) |

(52) U.S. Cl.
CPC .............. *G06F 1/1616* (2013.01); *G06F 1/188* (2013.01)

(58) Field of Classification Search
USPC ............. 361/679.55, 679.58, 679.59, 679.56, 361/679.26, 679.27, 679.28, 679.29, 679.3
See application file for complete search history.

(56) References Cited

U.S. PATENT DOCUMENTS

| 6,002,583 | A | 12/1999 | Shoji et al. |
| 6,376,931 | B1 | 4/2002 | Kim |
| 6,385,041 | B1 | 5/2002 | Choi |
| 6,535,378 | B1 | 3/2003 | Oguchi et al. |
| 6,617,063 | B1 | 9/2003 | Ohnishi |
| 7,333,324 | B2 | 2/2008 | DeLuga |
| 7,784,752 | B2 * | 8/2010 | Tang ..................... 248/188.8 |
| 7,835,150 | B2 * | 11/2010 | Degner et al. ........... 361/679.58 |
| 7,929,298 | B2 * | 4/2011 | Hsu ..................... 361/679.59 |
| 8,139,357 | B2 * | 3/2012 | Trang ..................... 361/679.59 |
| 8,537,546 | B2 * | 9/2013 | Shih ..................... 361/679.59 |
| 2007/0030635 | A1 | 2/2007 | Song |
| 2013/0178161 | A1 * | 7/2013 | Shulenberger ............. 455/41.2 |

FOREIGN PATENT DOCUMENTS

JP          06-169182 A          6/1994

OTHER PUBLICATIONS

PCT; "Notification of Transmittal of the International Search Report and the Written Opinion of the International Searching Authority, or the Declaration" PCT/US2010/033223; mailed Jan. 28, 2011; 9 pages.

* cited by examiner

*Primary Examiner* — Anthony Haughton
(74) *Attorney, Agent, or Firm* — Brooks, Cameron & Huebsch, PLLC

(57) ABSTRACT

Embodiments of the present invention disclose a battery ejection system for a portable computer. According to one embodiment, the system includes at least one foot pad formed on an underside of the portable computer and a battery unit configured to releasably attach to the portable computer. Furthermore, the foot pad is configured to release the battery unit from the portable computer.

15 Claims, 6 Drawing Sheets

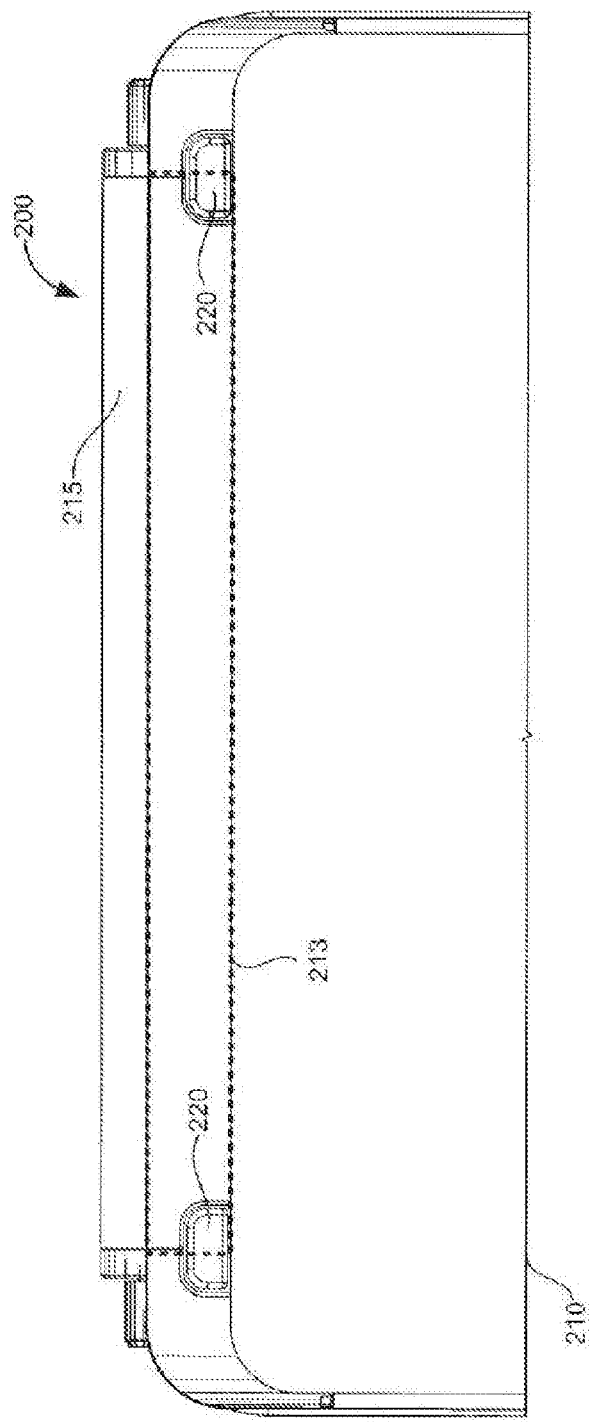

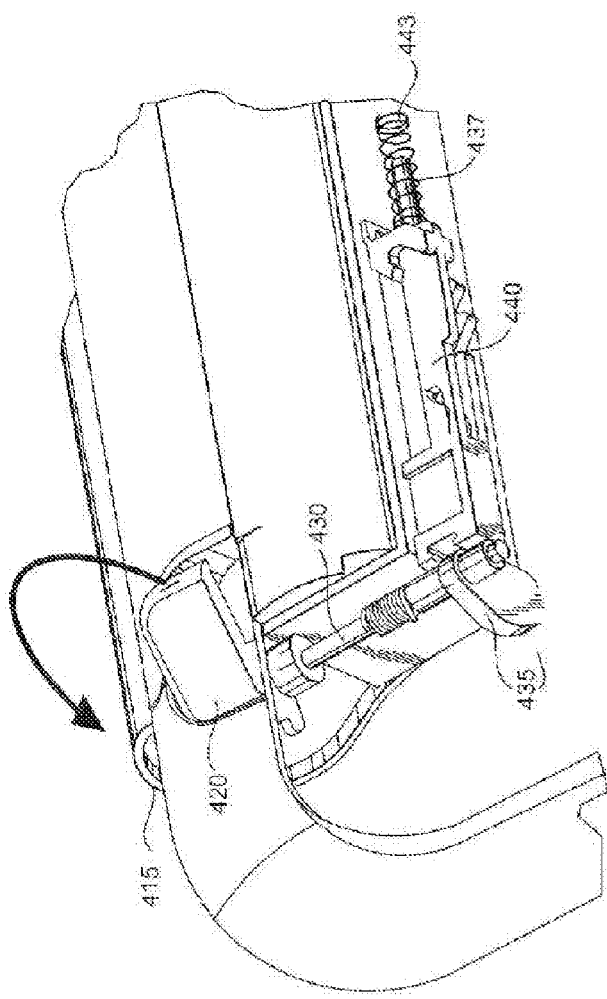
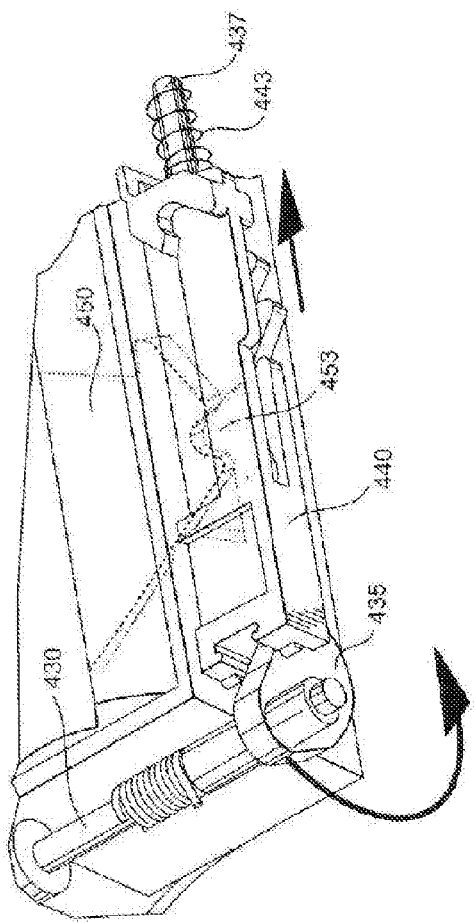

BATTERY EJECTION SYSTEM FOR A PORTABLE COMPUTER

BACKGROUND

Portable computers have become commonplace in today's mobile society and have seemingly supplanted traditional desktop computers as the preferred work and home computer. Laptop or notebook computers, netbooks, and tablet personal computers are a few examples of portable computers that permeate the current marketplace. These mobile workstations typically employ a clam-shell type design, come in a variety of sizes and features, and often include a removable battery unit for powering the internal electrical components. As the size and configuration of portable computers becomes increasingly smaller, optimal placement of the battery unit and the ejection means thereof becomes increasingly difficult. For example, simple insertion and removal of the battery unit from the portable computer can often be a cumbersome and complicated task for the ordinary user.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 2 is a perspective view of a bottom surface of a portable computer according to an embodiment of the present invention.

FIGS. 4A and 4B are three-dimensional cross-sectional views of the battery ejection method according to an embodiment of the present invention.

NOTATION AND NOMENCLATURE

Figure 1A:
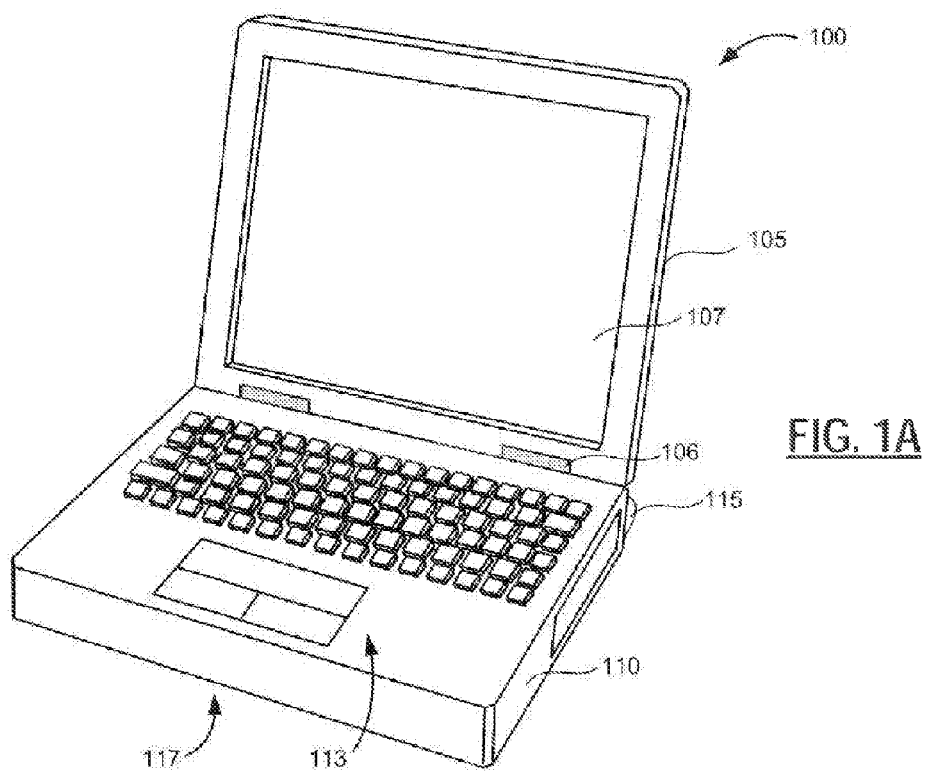
FIGS. 1A and 1B are three-dimensional perspective views of a portable computer according to an embodiment of the present invention.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . .". The term "couple" or "couples" is intended to mean either an indirect or direct connection. Thus, if a first component couples to a second component, that connection may be through a direct electrical connection, or through an indirect electrical connection via other components and connections, such as an optical electrical connection or wireless electrical connection. Furthermore, the term "system" refers to a collection of two or more hardware and/or software components, and may be used to refer to an electronic device or devices, or a sub-system thereof.

DETAILED DESCRIPTION OF THE INVENTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional battery ejection systems for notebook computers are generally exposed outside of system for easy user accessibility. Common implementation include slide in, flip out, and push mechanisms that provide physical movement for ejection of a battery pack. Accordingly, these types of latches have a tendency to protrude or recess from its surrounding structure so as to offer better friction for the battery pack and portable computer. However, such a configuration undesirably counters the sleek design intention of the manufacturer of an ultra mobile device, has wearing issues, or is difficult to operate quickly and easily.

Embodiments of the present invention provide a battery ejection system for a portable computing device. According to one embodiment, the battery ejection system is incorporated into the foot pads positioned on the bottom surface of the portable computer. As such, the battery unit of the portable computer is well integrated and protected, and the ejection system requires little to no additional external pieces for the computer manufacturer, thereby making it highly desirable and conducive to the manufacture of an ultra thin and light mobile device. Furthermore, such a configuration provides a better experience and usability for the end user, and also provides a significantly improved feature for computers employing compact designs.

Figure 1B:
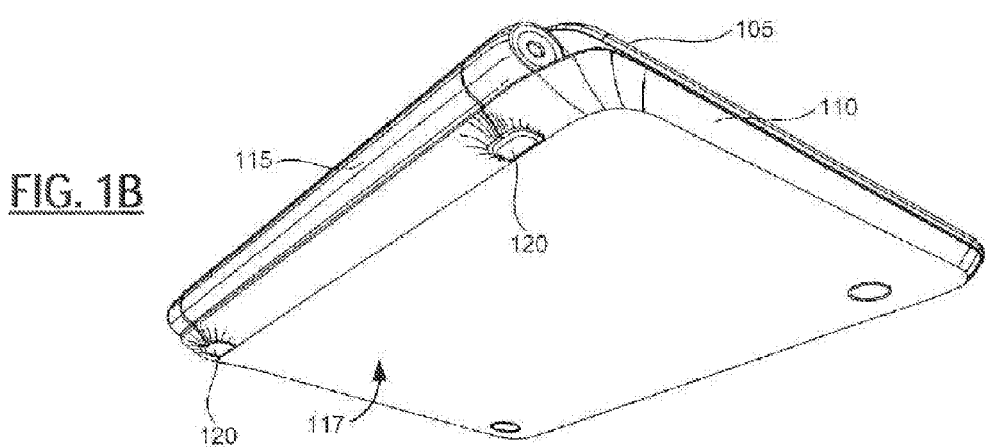

Referring now in more detail to the drawings in which like numerals identify corresponding parts throughout the views, FIGS. 1A and 1B are three-dimensional perspective views of a portable computer according to an embodiment of the present invention. Portable computer 100 includes an upper housing 105 and a base housing 110 connected to each other via a hinge 106 or other pivot mechanism. The upper housing 102 includes electrical wiring adapted to provide a display 107 to a user. As shown in FIG. 1A, the base housing 110 includes a top surface 113 and bottom surface or underside area 117 that is opposite the top surface 113. According to one embodiment, the base housing includes a battery unit 115 positioned on a rear side of the base housing near the hinge 106 or pivot mechanism that connects the upper housing 105 and base housing 110 of the portable computing device 100.

FIG. 1B is a perspective view of an underside area or bottom surface 117 of the base housing 110 according to an embodiment of the present invention. As shown here, the base housing 110 includes a battery unit 115 and two foot pads 120. Battery unit 112 includes a battery housing that surrounds an electrical battery such as a lithium ion battery cell, or any other removable power source for a portable computer. According to one embodiment, foot pads 120 are both formed integral with the base housing 110 and are configured to selectively release the battery unit 115 from the base housing 110 of the portable computer 100. The foot pads 120 extend perpendicularly from the bottom surface 117 of the portable computer 100 so as to lift the portable computer when it is placed on a contact surface for operation by a user. Furthermore, the foots pads 120 may be formed from a anti-skid material such as a rubber, vinyl, neoprene, matter, or similar material, so as to prevent the portable computer 100 from sliding when the underside area 117 is placed on the contact surface. Moreover, the battery unit 115 may be released from the base housing 110 by activating both foot pads 120 as will be described in further detail below.

FIG. 2 is a perspective view of a bottom surface of a portable computer according to an embodiment of the present invention. As shown here, the bottom surface 217 of the base housing 210 includes two foot pads 220 positioned in close proximity to the battery unit 215, and a battery cavity 213 (indicated by dotted lines) for insertion and removal of the battery unit 215 from the portable computer. In particular, foot pads 220 are placed near opposite sides of the base housing 210 and near lower corners of the battery cavity 214 of the base housing 210 so as to correspond with lower corners of the battery unit 215 along the length-wise (i.e. longest side) direction. Though foot pads 220 are shown as rectangular in shape, foot pads 220 may be circular, oval, or any other shape or orientation.

Figure 3:
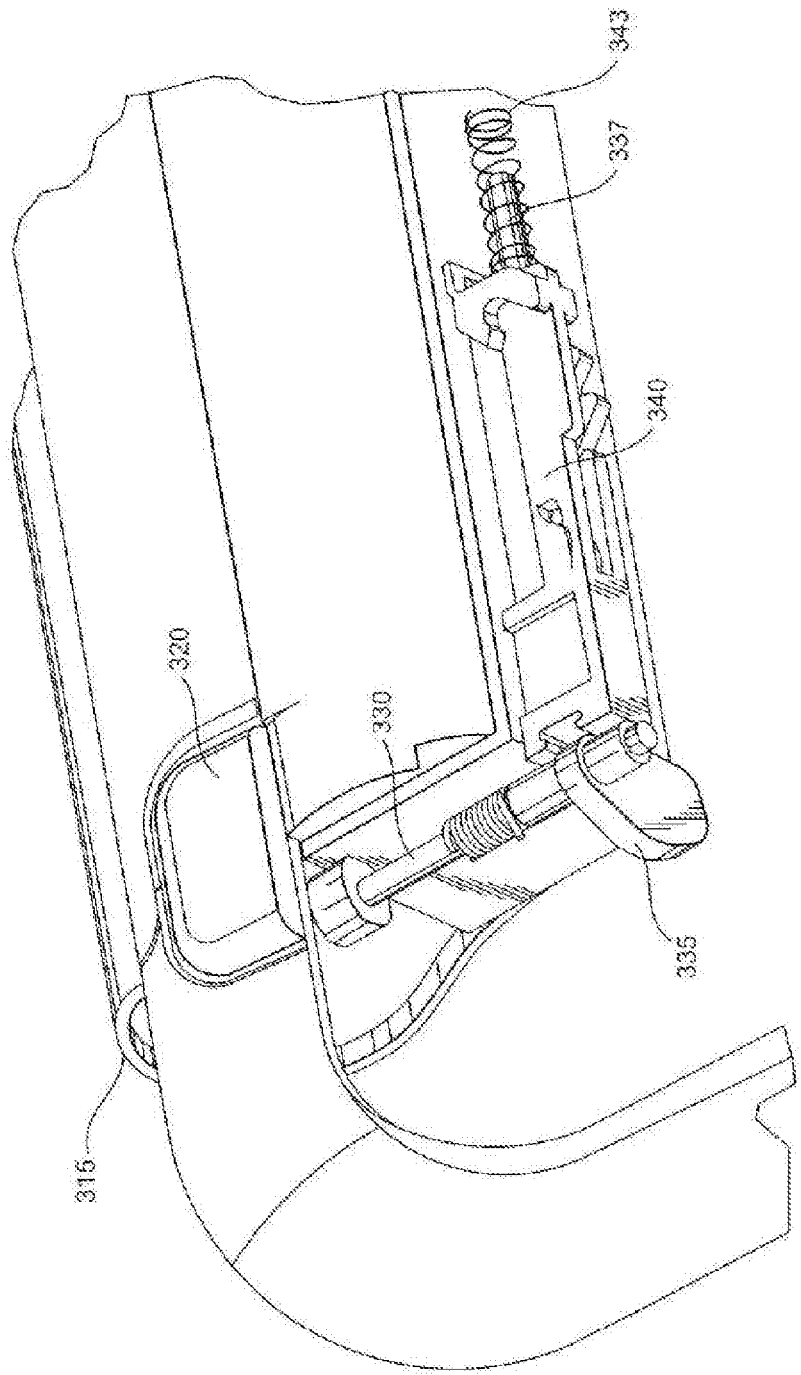
FIG. 3 is a three-dimensional cross-sectional view of the notebook computer and internal components of the battery ejection system according to an embodiment of the present invention.

FIG. 3 is a three-dimensional cross-sectional view of the notebook computer and internal components of the battery ejection system according to an embodiment of the present invention. According to one embodiment, foot pad 320 is directly connected to a latch axis 330, which extends perpendicularly away from the battery unit 315. Latch axis 330 is coupled to a latch member 335 and battery latch 340. Furthermore, the battery latch includes a protruding portion 337 at an end opposite the latch member 335, and an attached spring 443 formed around the protruding portion 337 as shown in FIG. 3. As the latch axis rotates, the latch member 335 rotates and the battery latch 340 slides so as to release the battery unit 315 from the base housing of the portable computer as will be explained in further detail below.

FIGS. 4A and 4B are three-dimensional cross-sectional views of the battery ejection method according to an embodiment of the present invention. As shown in FIG. 4A, the foot pad may operate as a flip latch and upon activation, either via physical movement (i.e. depress or flip) from a user or automatically, the foot pad 420 rotates counterclockwise along the horizontal axis of latch axis 430. Upon such activation, the latch axis 430 may rotate clockwise so as to cause the latch member 435 to rotate and abut the battery latch 440 as shown in FIG. 4B. According to the embodiment of FIG. 4B, the battery latch 440 includes a latch engaging portion 453, while the battery unit 415 includes a locking member 450 configured to engage with the battery latch 440. A more detailed description of the battery latch 440 and locking member 450 will be described in further detail with reference to FIGS. 5A and 5B.

Referring to embodiment depicted in FIG. 4A, when the foot pad 420 is flipped from a closed position to an open position as shown, the spring 443 lies in an expanded position so as to enclose the exposed portion 437 of the battery latch 440. As the foot pad 420 and axis latch 430 further rotate, the latch member 435 presses on the battery latch 440, which slides toward the center of the portable computer and causes the spring 443 to contract, thus allowing the exposed portion 437 of the battery latch 440 to protrude from the spring 443 as shown in FIG. 4B. By the same measure, when the foot pad 420 is rotated back to a closed position, the spring 443 expands so as to push and maintain the battery latch 440 and latch member 435 in the original latched and fixed position.

Figure 5A:
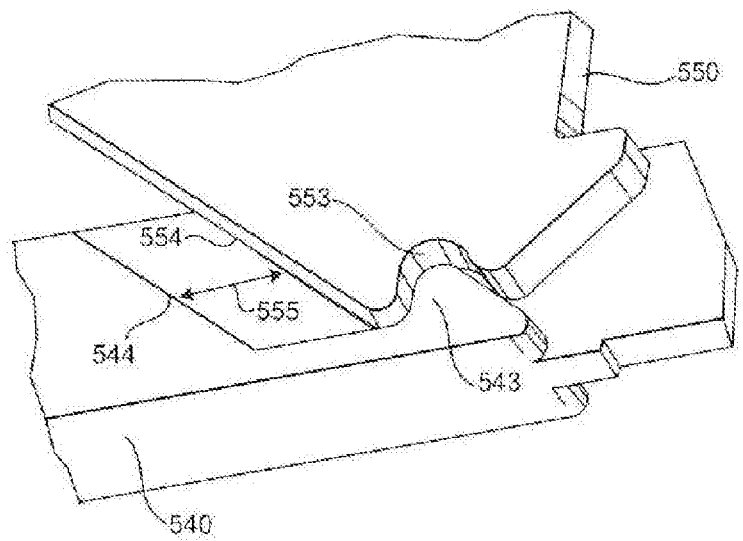
FIGS. 5A and 5B are three-dimensional cross-sectional views of the battery ejection system according to embodiments of the present invention.
Figure 5B:
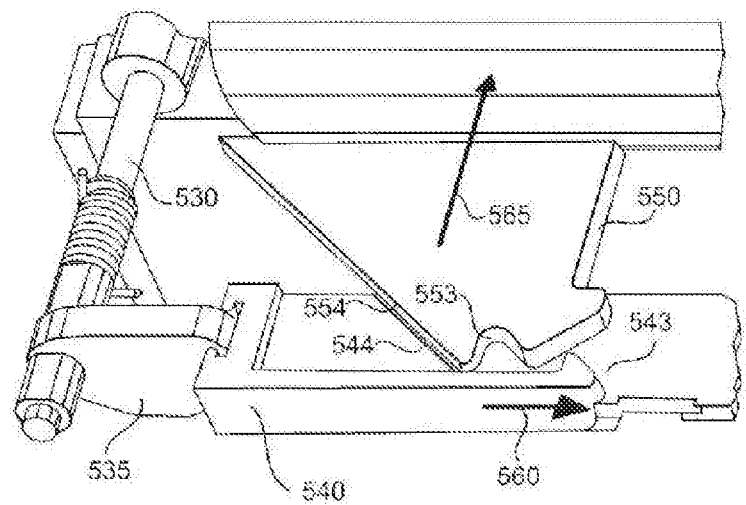

FIGS. 5A and 5B are three-dimensional views of the battery latch system according to embodiments of the present invention. As shown in the embodiment of FIG. 5A, the locking member 550 includes a locking cavity 553 and an inclined edge 554, while the battery latch 540 includes an engaging portion 543 and inclined edge 544. When the battery unit is in a fixed and locked position with the portable computer, the engaging portion 543 of the battery latch 540 rests within the locking cavity 553 of the locking member 550, while the inclined edges 554 and 544 of the locking member 550 and battery latch 540 respectively are separated from each other by a small distance indicated by the bidirectional arrow 555. Furthermore, and as shown in the illustration of FIG. 5B, when the foot pad is activated for releasing the battery unit, the latch axis 530 and latch member 535 rotate so as to cause the battery latch 540 to move toward the center of the portable computer as described above. More specifically, movement of the battery latch 540 causes the engaging portion 543 to move out and away (as indicated by arrow 560) from the locking cavity 553 of the locking structure 550, while the inclined edges 554 and 544 of the locking member 550 and battery latch 540 respectively come into near or actual contact with each other. In this opened and unlatched position, the battery unit and locking member are unrestrained and may be removed from the portable computer and base housing as indicated by arrow 565.

Figure 6:
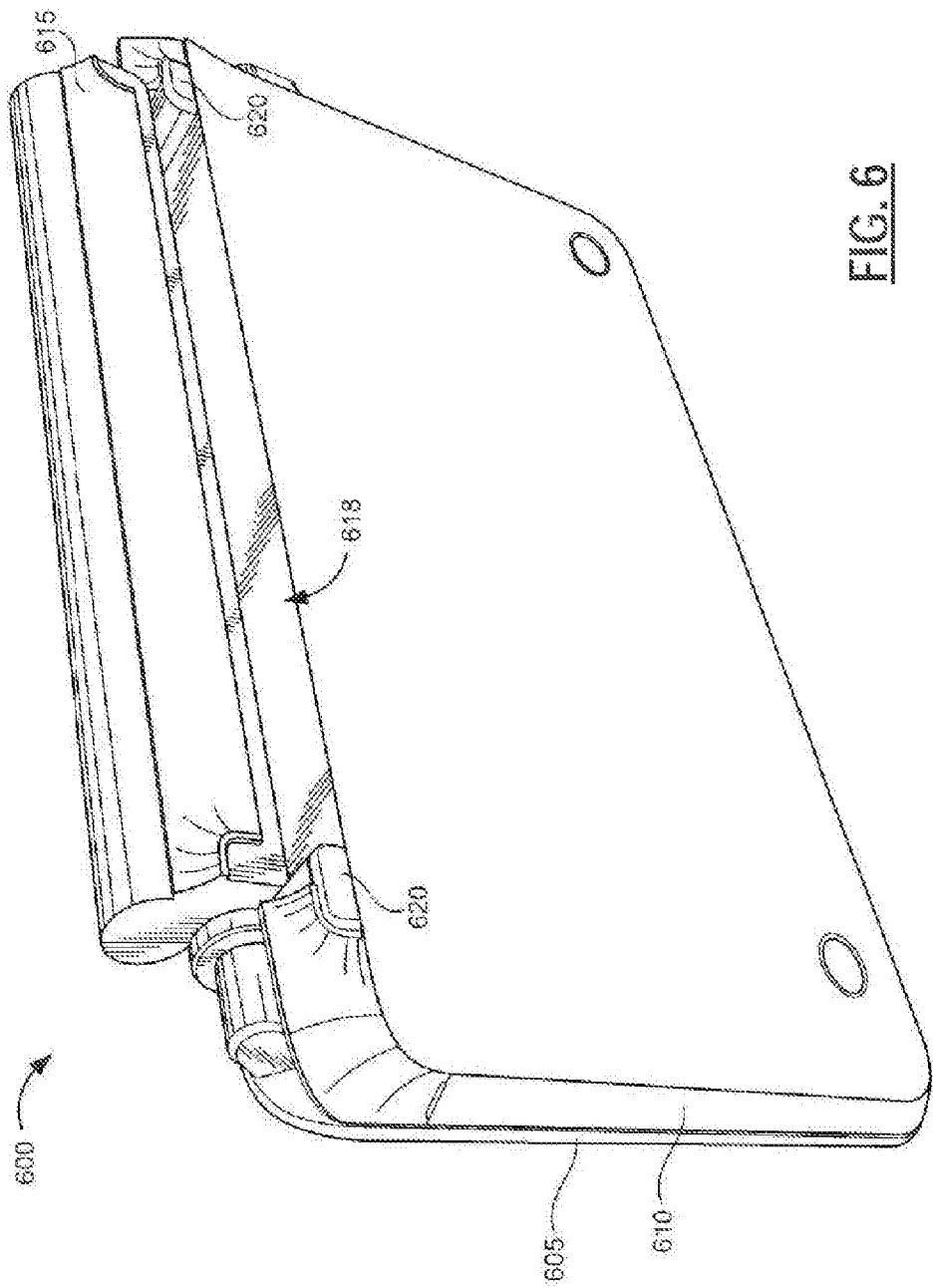
FIG. 6 is a three-dimensional view illustrating the removal of the battery unit from a portable computer according to an embodiment of the present invention.

FIG. 6 is a three-dimensional view illustrating the removal of the battery from a portable computer according to an embodiment of the present invention. Upon unlatching or activating the at least one foot pad 620, the battery 615 is unlatched and may be removed from the battery cavity 618 formed in the base housing 610. That is, the battery unit 615 may be lifted upward and away from the base housing 610 and upper housing 605 of the portable computer 600. In the present embodiment, two foot pads 620 are formed integral with the base housing 610 at opposite corners of the housing cavity 619. According to one embodiment, both foot pads 620 are activated in order to remove the battery unit 615 from the portable computer 600. However, the battery ejection system of embodiments of the present invention may also operate with use of only one foot pad 620.

Embodiments of the present invention provide a battery ejection system for a portable computing device. In accordance with at least one embodiment, the battery ejection system is integrated with anti-skid foot pads positioned along the bottom surface of the portable computer. Such a configuration significantly reduces the number of parts required to manufacture a compact portable computer and also provides a better experience and usability for the end user.

While the invention has been described with respect to exemplary embodiments, one skilled in the art will recognize that numerous modifications are possible. For example, although exemplary embodiments depict a notebook computer as the portable computer, the invention is not limited thereto. For example, the portable computer may be a netbook, a tablet personal computer, a cell phone, or any other electronic device having a clam shell housing arrangement.

Furthermore, though the illustrated embodiments depict the battery unit positioned on a rear side (i.e. the side closest to the hinge) of the base housing, the battery unit and ejection system may be placed at any position on the portable computer that will support the battery ejection system described herein. Thus, although the invention has been described with respect to exemplary embodiments, it will be appreciated that the invention is intended to cover all modifications and equivalents within the scope of the following claims.

What is claimed is:

1. A battery ejection system for a portable computer, the system comprising:
    at least one foot pad coupled to an underside of the portable computer;
    a battery unit formed integral with a rear side of the portable computer and configured to releasably attach to a base housing;
    a battery latch and latch axis coupled to the at least one foot pad; and
    a locking member coupled to the battery unit and configured to engage with the battery latch coupled to the at least one foot pad;
    wherein the at least one foot pad is configured to release the battery unit from the portable computer in response to an activation, wherein the activation includes rotation of the at least one foot pad away from the underside of the base housing to cause the latch axis to rotate and the battery latch to disengage from the locking member.

2. The battery ejection system of claim 1, wherein the at least one pad is comprised of an anti-skid material.

3. The battery ejection system of claim 1,
    wherein the activation further includes rotation of the at least one foot pad counterclockwise along a horizontal axis of the latch axis.

4. The battery ejection system of claim 1, wherein the battery is released when the at least one foot pad is activated by a user.

5. The battery ejection system of claim 4, wherein the battery latch includes a protruding portion at an end opposite the latch member, and an attached spring is formed around the protruding portion to assist with the release of the battery unit.

6. The battery ejection system of claim 1, wherein the underside of the portable computer includes two foot pads configured to release the battery unit from the portable computer.

7. The battery ejection system of claim 6, wherein the portable computer includes an upper housing for providing display to a user, and a base housing for accommodating processing components of the portable computer; and
    wherein the two foot pads are formed integral with a bottom surface of the base housing.

8. A portable computer comprising:
    a base housing for accommodating processing components of the portable computer;
    a battery unit formed integral with a rear side of the portable computer and configured to releasably attach to the base housing;
    at least one foot pad positioned on an underside of the base housing and extending perpendicularly away from the portable computer so as to lift an underside of the base housing from a contact surface,
    a latch member coupled to the at least one foot pad; and
    a engaging member coupled to the battery unit and configured to engage with the latch member coupled to the at least one foot pad;
    wherein the at least one foot pad is configured to release the battery unit from the base housing in response to an activation, wherein the activation includes rotation of the at least one foot pad away from the underside of the base housing to cause the latch member to disengage from the engaging member.

9. The portable computer of claim 8, further comprising:
    wherein the latch member slides to release the battery unit from the base housing of the portable computer.

10. The portable computer of claim 8, wherein the at least one pad is comprised off an anti-skid material.

11. The portable computer of claim 8, wherein the battery unit is positioned on a rear side of the base housing near a pivot mechanism that connects an upper housing and the base housing of the portable computing device.

12. The portable computer of claim 11, wherein the at least one foot pad operates as a flip latch and, upon the activation, rotates counterclockwise along a horizontal axis of a latch axis.

13. The portable computer of claim 8, wherein the base housing includes a battery cavity for insertion and removal of the battery unit.

14. The portable computer of claim 13, wherein the underside of the base housing includes two foot pads configured to release the battery unit from the battery cavity of the portable computer.

15. A portable computer having a clamshell housing arrangement, the portable computer comprising:
    an upper housing pivotably coupled to a base housing having a battery cavity, wherein the upper housing includes a display and the base housing accommodates processing components of the portable computer;
    a battery unit formed integral with a rear side of the portable computer and configured to releasably attach to the base housing;
    at least one foot pad positioned on an underside of the base housing and extending perpendicularly therefrom so as to lift an underside of the base housing from a contact surface;
    a latch member coupled to the at least one foot pad; and
    an engaging member coupled to the battery and configured to engage with the latch member such that the battery unit remains in a fixed position within the battery cavity of the base housing,
    wherein the foot pad is configured to release the battery unit from the base housing in response to an activation, wherein the activation includes rotation of the at least one foot pad away from the underside of the base housing to cause the latch member to disengage from the engaging member.

* * * * *